US010713385B2

(12) United States Patent
Nishimura et al.

(10) Patent No.: US 10,713,385 B2
(45) Date of Patent: Jul. 14, 2020

(54) POSITION DATA PSEUDONYMIZATION

(71) Applicant: International Business Machines Corporation, Armonk, NY (US)

(72) Inventors: Yasutaka Nishimura, Yamato (JP); Mari Abe Fukuda, Tokyo (JP); Shoichiro Watanabe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 185 days.

(21) Appl. No.: 16/026,393

(22) Filed: Jul. 3, 2018

(65) Prior Publication Data
US 2020/0012815 A1   Jan. 9, 2020

(51) Int. Cl.
*G06F 21/00* (2013.01)
*G06F 21/62* (2013.01)
*G06F 21/60* (2013.01)

(52) U.S. Cl.
CPC ........ *G06F 21/6254* (2013.01); *G06F 21/602* (2013.01)

(58) Field of Classification Search
None
See application file for complete search history.

(56) References Cited

U.S. PATENT DOCUMENTS

| 9,547,845 | B2  | 1/2017 | Agrawal |           |
|-----------|-----|--------|---------|-----------|
| 10,043,036 | B1* | 8/2018 | Dawkins | H04L 9/0618 |

| 2012/0309350 | A1  | 12/2012 | Kim     |             |
|--------------|-----|---------|---------|-------------|
| 2015/0007341 | A1  | 1/2015  | Cai     |             |
| 2015/0067806 | A1* | 3/2015  | Ninjouji | G06F 21/31 726/7 |
| 2017/0147673 | A1* | 5/2017  | Burdick | G06F 16/2465 |

FOREIGN PATENT DOCUMENTS

| CN | 103249038 A   | 8/2013  |
|----|---------------|---------|
| CN | 103927905 A   | 7/2014  |
| CN | 104394509 A   | 3/2015  |
| CN | 106209813 A   | 12/2016 |
| WO | 2008154941 A1 | 12/2008 |

(Continued)

OTHER PUBLICATIONS

List of IBM Patents or Patent Applications Treated as Related, Jul. 15, 2019, 2 pgs.

(Continued)

*Primary Examiner* — Maung T Lwin
(74) *Attorney, Agent, or Firm* — Robert J. Shatto

(57) ABSTRACT

Position data may gradually pseudonymized by a method, comprising: generating a sequence of relative positions from a sequence of absolute positions of a moving object; randomizing the sequence of relative positions using at least a sequence of random numbers generated from at least one seed; in response to receiving an analytical job comprising the at least one seed, restoring the sequence of relative positions from the randomized sequence of relative positions; and in response to receiving an analytical job comprising both the at least one seed and at least one absolute position derived from the sequence of absolute positions, restoring the sequence of absolute positions from the randomized sequence of relative positions.

9 Claims, 10 Drawing Sheets

(56) References Cited

FOREIGN PATENT DOCUMENTS

WO    2018051746 A1    3/2018

OTHER PUBLICATIONS

International Search Report and Written Opinion, Application No. PCT/IB2019/055447, dated Oct. 22, 2019, filed Jun. 27, 2019, 10 pgs.

Bird, Katie, ""Pseudonymization"— new ISO specification supports privacy protection in health informatics", International Organization for Standardization, Mar. 10, 2009, 3 pages, <https://www.iso.org/news/2009/03/Ref1209.html>.

Chen, et al., "Efficient Pseudonym Changing Schemes for Location Privacy Protection in VANETs", 2013 International Conference on Connected Vehicles and Expo (ICCVE), pp. 937-938.

Liao, et al., "Protecting User Trajectory in Location-Based Services", 2015 IEEE Global Communications Conference (GLOBECOM), Dec. 6-10, 2015, San Diego, CA, USA, 6 pages.

Mano, et al., "Privacy-preserving Publishing of Pseudonym-based Trajectory Location Data Set", 2013 International Conference on Availability, Reliability and Security, Sep. 2-6, 2013, Regensburg, Germany, pp. 615-624.

Narendranath, et al., "Preserves Source Location Privacy and It Is Collusion Resistant to Determine the Current Location", International Journal of Scientific Engineering and Technology Research, vol. 03, Issue.47, Dec. 2014, pp. 9554-9560.

\* cited by examiner

800

```
Driver Behavior Analysis:
{
 "orig_time": "20xx12021301",
 "orig_lon": "28.0284711",
 "orig_lat": "123.032123",
 "seed": 1098.2342
 "from": "2017-04-02",
 "to": "2017-04-10"
}
```

900

```
Trajectory Pattern Analysis:
{
 "seed": 1098.2342
 "from": "2017-04-02",
 "to": "2017-04-10"
}
```

POSITION DATA PSEUDONYMIZATION

BACKGROUND

The present disclosure relates to pattern analysis, and more specifically, trajectory position data pseudonymization.

Pseudonymization refers to a data management and/or de-identification procedure from which personalized identifiable information within a data record are replaced by one or more artificial identifiers, or pseudonyms.

SUMMARY

Aspects of the present disclosure are directed to a method for position data pseudonymization. The method can comprises generating a sequence of relative positions from a sequence of absolute positions of a moving object. The method can further comprise randomizing the sequence of relative positions using at least a sequence of random numbers generated from at least one seed. In response to receiving an analytical job comprising the at least one seed, the method can further comprise restoring the sequence of relative positions from the randomized sequence of relative positions. Lastly, in response to receiving an analytical job comprising both the at least one seed and the at least one absolute position derived from the sequence of absolute positions, the method can comprise restoring the sequence of absolute positions from the randomized sequence of relative positions.

Aspects of the present disclosure are directed to an apparatus for position data pseudonymization. The apparatus comprises a processor or a programmable circuitry, and one or more computer readable mediums collectively including instructions. When executed by the processor or programmable circuitry, the instructions can be configured to generate a sequence of relative positions from a sequence of absolute positions of a moving object. The instructions can further be configured to randomize the sequence of relative positions using at least a sequence of random numbers generated from at least one seed. In response to receiving an analytical job comprising the at least one seed, the instructions can further be configured to restore the sequence of relative positions from the randomized sequence of relative positions. Lastly, in response to receiving an analytical job comprising both the at least one seed and the at least one absolute position derived from the sequence of absolute positions, the instructions can be additionally configured to restore the sequence of absolute positions from the randomized sequence of relative positions.

Aspects of the present disclosure are further directed to a computer program product for position data pseudonymization. The computer program product includes one or more computer readable storage mediums collectively storing program instructions that are executable by a processor or programmable circuitry to cause the processor or programmable circuitry to generate a sequence of relative positions from a sequence of absolute positions of a moving object. The program instructions can further cause the processor to randomize the sequence of relative positions using at least a sequence of random numbers generated from at least one seed. In response to receiving an analytical job comprising the at least one seed, the program instructions can further cause the processor to restore the sequence of relative positions from the randomized sequence of relative positions. Lastly, in response to receiving an analytical job comprising both the at least one seed and the at least one absolute position derived from the sequence of absolute positions, the program instructions can cause the processor to restore the sequence of absolute positions from the randomized sequence of relative positions.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

DETAILED DESCRIPTION

Aspects of the present disclosure relate generally to pattern analysis, and more specifically to, pseudonymization. While the present disclosure is not necessarily limited to such application, various aspects of the disclosure may be appreciated through a discussion of various examples using the context of pseudonymization.

In attempts to reinforce global regulations relating to security and privacy (e.g., General Data Protection Regulation (GDPR), etc.), privacy information (e.g., data) has been stored by anonymization and encryption. However, with encryption, all privacy information is disclosed when decryption occurs and an analysis specialized to trajectories cannot be performed through simple data replacement. Pseudonymization is a form of data analysis used to protect privacy information from decryption.

Aspects of the present disclosure relate to storing privacy information with different identification information and further recovering stored information with a stored corresponding table. Values at the start of data collection are stored within a separate storage region. At the completion of the data collection, a seed of pseudo random numbers is stored in the separate storage region. To complete pseudonymization, the privacy information is replaced and randomized until information retrieval is deemed necessary. During information retrieval, information for canceling pseudonymization is initiated and only the privacy information, specific to information analysis, is restored and disclosed.

Aspects of the present disclosure further relate to the trajectories generated by global positioning systems, and mores specifically, the unregulated latitude and longitude data transmitted from vehicles (e.g., cars) and pedestrians (e.g., people). Aspects of the present disclosure propose to regulate latitude and longitude data transmitted from vehicles and pedestrians, hereinafter referred as personal data, in reinforcement of global security and privacy regulations (e.g., GDPR). Generated from a global positioning system (GPS), relative pseudonymization of a vehicle (e.g., vehicle trajectory shape) and the encryption of absolute position data (e.g., generated trajectory) may be used for information analysis once the pseudonymized or encrypted data is restored.

Aspects of the present disclosure propose to store position data (measured in longitude and latitude) at the start of vehicular trajectories (e.g., directional path) in an alternative storage region, while further storing position data throughout the duration of the vehicular trajectory. At the conclusion of the vehicular trajectory, a randomly generated pseudonymization seed number replaces personal identification information.

Figure 1:
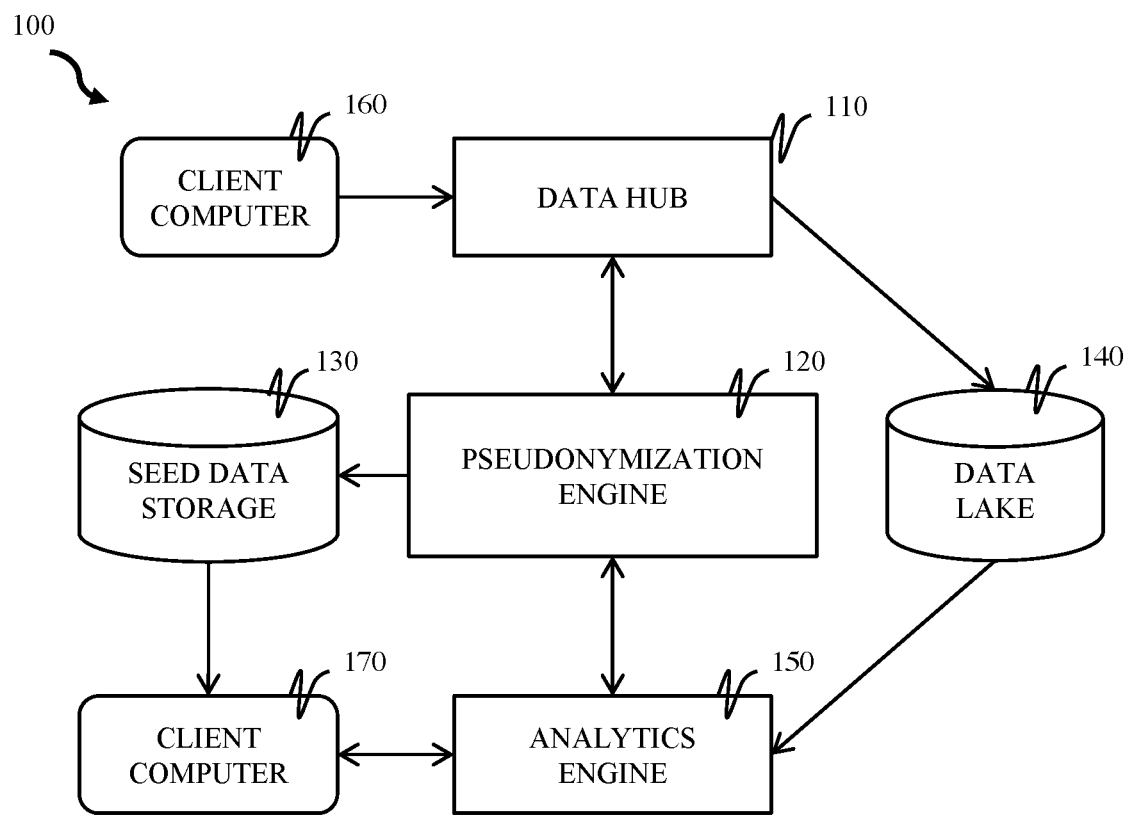
FIG. 1 is a diagram illustrating data flow in an example system for pseudonymization, in accordance with embodiments of the present disclosure.

Referring now to the figures, FIG. 1 is a diagram illustrating data flow in an example system 100 for pseudonymization, in accordance with embodiments of the present disclosure. The system 100 may gradually pseudonymize position data such as the absolute position of a moving object (e.g., vehicle, pedestrian, etc.). In embodiments, the system 100 comprises a data hub 110, a pseudonymization engine 120, a seed data store 130, a data lake 140, and analytics engine 150.

The data hub 110 may function as a hub for the system 100. The data hub 110 may receive one or more sequences of absolute position data for a moving object from, for example, client computer 160. Client computer 160 can comprise, but is not limited to, an individual computer that accesses the position data information and programs stored on a server as part of a network environment.

The data hub 110 may provide the pseudonymization engine 120 with the sequence of absolute position data. The data hub 110 may also receive a sequence of a randomized sequence of relative position data from the pseudonymization engine 120, and further store the randomized sequence of relative position data in the data lake 140. The data hub 110 may be implemented by a computer.

The pseudonymization engine 120 may pseudonymize the absolute positions of the moving object. In an embodiment, the pseudonymization engine 120 may generate the randomized sequence of relative position data of the moving object and at least one seed from the absolute positions of the moving object. The pseudonymization engine 120 may provide the data hub 110 with the randomized sequence of relative positions of the moving object. The pseudonymization engine 120 may then store the at least one seed and at least one absolute position in the seed data storage 130. In some embodiments, the at least one see and at least on absolute position can be comprised within an analytical job.

The pseudonymization engine 120 may receive a request to restore the sequence of relative positions or the sequence of absolute positions from the analytics engine 150 and restore the sequence of relative positions or the sequence of absolute positions. In an embodiment, the pseudonymization engine 120 may receive the randomized sequence of relative positions and the at least one seed from the analytics engine, and restore a sequence of relative positions of the moving object.

In an embodiment, the pseudonymization engine 120 may receive the randomized sequence of relative positions, the at least one seed, and at least one absolute position from the analytics engine and restore a sequence of absolute positions of the moving object. The pseudonymization engine 120 may provide the analytics engine 150 with the restored sequence.

The seed data store 130 may store the at least one seed provided by the pseudonymization engine 120. The seed data store 130 may store the at least one absolute position of the moving object. The seed data store 130 may be implemented by one or more database servers. The seed data store 130 may store other data used for data analysis.

The data lake 140 may store a variety of data used for data analysis. The data lake 140 may store at least the randomized sequence of relative positions provided by the data hub 110. The data lake 140 may be implemented by one or more database servers. In an embodiment, the data lake 140 may be an open database that is open to the public.

The analytics engine 150 may receive the at least one seed from, for example, client computer 170 (which may be different from or the same as the client computer 160) and the sequence of the relative positions of the moving object from the data lake 140. The analytics engine 150 may provide the pseudonymization engine 120 with the at least one seed and the sequence of the relative positions of the moving object.

The analytics engine 150 may further receive the at least one absolute position of the moving object from client computer 170 and provide the pseudonymization engine 120 with the at least one absolute position.

The analytics engine 150 may receive a restored sequence of relative positions of a moving object, or a restored sequence of absolute positions of a moving object from the pseudonymization engine 20. In an embodiment, the analytics engine 150 may receive a plurality of restored sequences of relative or absolute positions of a plurality of moving objects from the pseudonymization engine 120. The analytics engine 150 may process an analytical job for the plurality of restored sequences of relative or absolute positions. The analytics engine 150 may be implemented by a computer.

It is noted that FIG. 1 is intended to depict the representative components of an example system 100 for pseudonymization configuration. In some embodiments, however, individual components can have greater or lesser complexity than as represented in FIG. 1, components other than or in addition to those shown in FIG. 1 can be present, and the number, type, and configuration of such components can vary.

Figure 2:
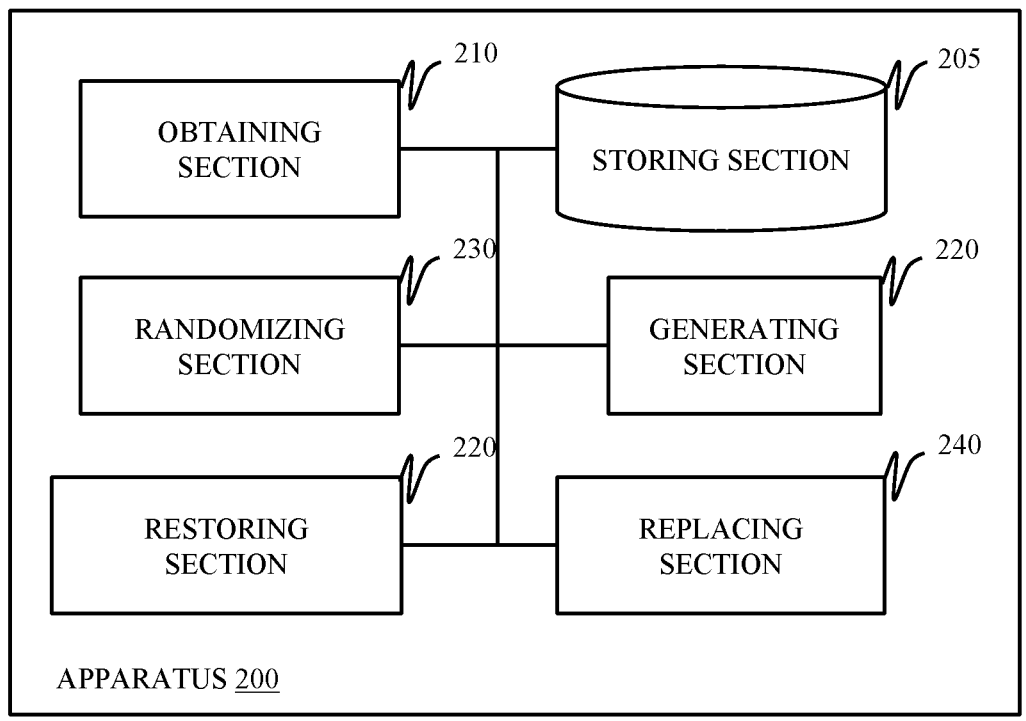
FIG. 2 is a diagrammatic depiction of an example apparatus for a pseudonymization engine, in accordance with embodiments of the present disclosure.

FIG. 2 is a diagrammatic depiction of an example apparatus 200 for a pseudonymization engine, in embodiments with the present disclosure. In some embodiments, aspects of apparatus 200 can operate as the pseudonymization engine 120 in FIG. 1.

Apparatus 200 may include a processor and/or programmable circuitry. Apparatus 200 may further include one or more computer readable mediums collectively including instructions. The instructions may be embodied on the computer readable medium and/or the programmable circuitry. The instructions, when executed by the processor or the programmable circuitry, may cause the processor or the programmable circuitry to operate as a plurality of operating sections.

Thereby, apparatus 200 in the example of FIG. 2 includes a storing section 205, an obtaining section 210, a generating section 220, a randomizing section 230, a replacing section 240, and a restoring section 250.

The storing section 205 may store information used for the processing that apparatus 200 performs. The storing section 205 may also store a variety of data/instructions used for operations of the apparatus 200.

One or more other elements in apparatus 200 (e.g., obtaining section 210, generating section 220, randomizing section 230, replacing section 240, restoring section 250, etc.) may communicate data directly or via the storing section 205, as necessary.

The storing section 205 may be implemented by a volatile or non-volatile memory of apparatus 200. In some embodiments, the storing section 205 may store the sequence of absolute positions, the sequence of relative positions, the randomized sequence of relative positions, and other data related thereto.

The obtaining section 210 may obtain a variety of data necessary for operations of apparatus 200. The obtaining section 210 may obtain the sequence of absolute positions of the moving object. In an embodiment, the obtaining section 210 may obtain a plurality of car probe data including a sequence of absolute positions of the moving object (e.g., car). In the embodiment, the positions may correspond to car positions. Each car probe data may further include trip information identified by a trip ID of a trip by the moving object. The trip information may include a vehicle ID of the moving object (e.g., a car) and a driver ID of a driver of the moving object. In an embodiment, the obtaining section may obtain a part of the car probe data (e.g., trip ID) for managing positions of moving object.

The obtaining section 210 may obtain the sequence of absolute positions of a moving object when performing pseudonymization. The obtaining section 210 may obtain at least one seed, a sequence of relative positions of the moving object, and at least one absolute position of the moving object when restoring the absolute or relative positions. The obtaining section 210 may obtain other data necessary for operations in apparatus 200.

The generating section 220 may generate the sequence of relative positions from the sequence of absolute positions of the moving object.

The randomizing section 230 may randomize the sequence of relative positions using at least a sequence of random numbers generated from the at least one seed, thereby generating the randomized sequence of relative positions.

The replacing section 240 may replace an ID obtained by the obtaining section 210 (e.g., trip ID) with another ID. Thereby, the replacing section 240 may generate a pseudonymized ID (e.g., pseudonymized trip ID).

The restoring section 250 may restore the sequence of relative positions or the sequence of absolute positions of the moving object. In an embodiment, the restoring section 250 may restore the sequence of relative positions from the randomized sequence of relative positions in response to receiving the at least one seed from an analytics engine such as the analytics engine 150 of FIG. 1.

In an embodiment, the restoring section 250 may restore the sequence of absolute positions from the randomized sequence of relative positions in response to receiving the at least one seed and at least one absolute position from the analytics engine. The at least one absolute position may be derived from the sequence of absolute positions.

It is noted that FIG. 2 is intended to depict the representative components of an example apparatus 200 for a pseudonymization engine. In some embodiments, however, individual components can have greater or lesser complexity than as represented in FIG. 2, components other than or in addition to those shown in FIG. 2 can be present, and the number, type, and configuration of such components can vary.

Figure 3:
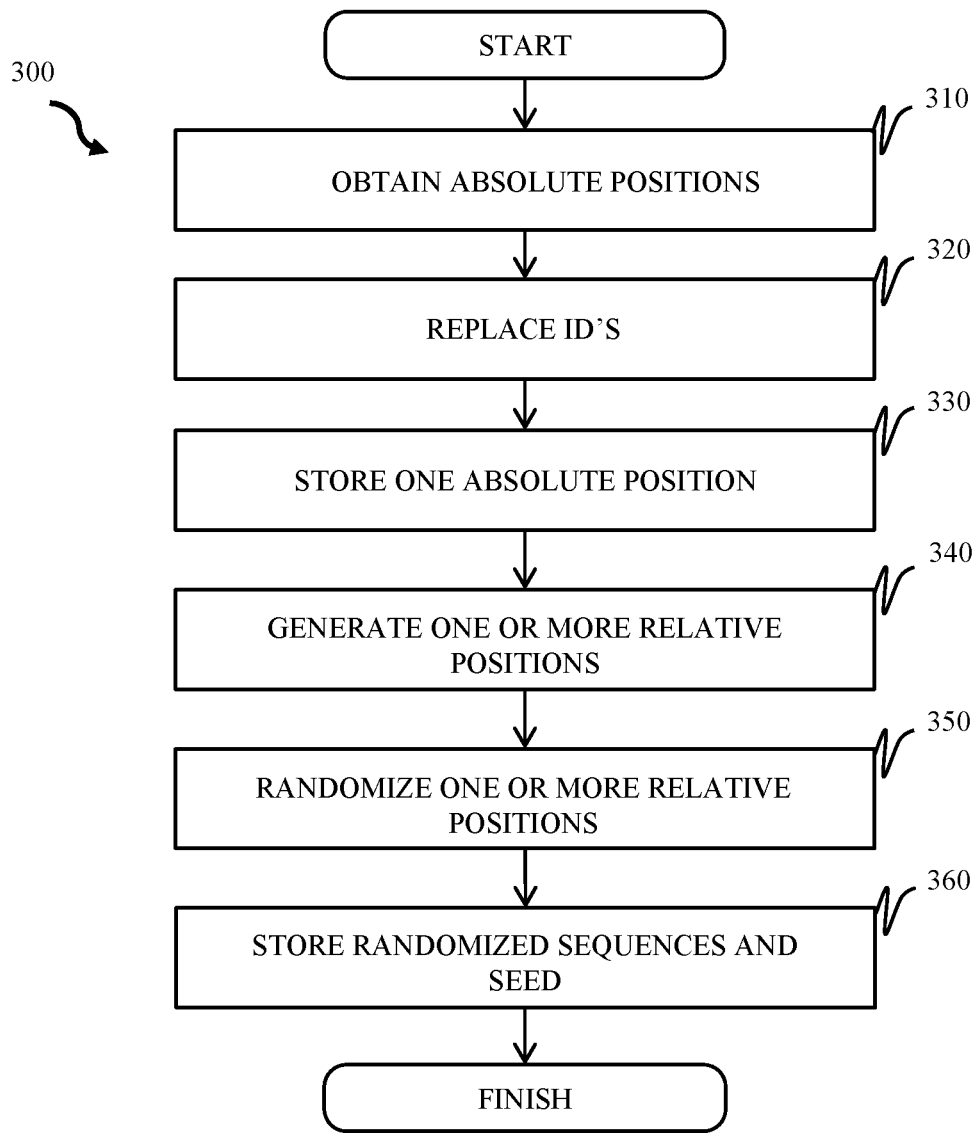
FIG. 3 is a flow diagram illustrating an example method for pseudonymization, in accordance with some embodiments of the present disclosure.

FIG. 3 is a flow diagram of an example method 300 for pseudonymization, in embodiments of the present disclosure. The operations of method 300 can be performed by a system, such as the system 100, to generate and store randomized sequences of relative positions of a moving object. The method 300 begins on operation 310.

In operation 310, a data hub, such as the data hub 110 of FIG. 1, may receive a sequence of absolute positions of a moving object from a client computer, such as the client computer 160. In an embodiment, the moving object may include a car and the data hub may receive a plurality of car probe data from the car.

In some embodiments, the plurality of car probe data may include the sequence of absolute positions of the car. The car probe data may be identified by a trip ID and may further include a driver ID of a driver of the car and a vehicle ID of the car. The data hub may obtain at least a part of IDs (e.g., trip ID) in the plurality of car probe data.

The data hub may provide an apparatus such as the apparatus 200 operating as the pseudonymization engine 120 of FIG. 1 with the received sequence of absolute positions of the moving object. In an embodiment, the data hub may provide the apparatus with ID (e.g., trip ID) the plurality of car probe data of a car. An obtaining section such as the obtaining section 210 of the apparatus 200 may receive the car probe data including the sequences of absolute positions.

In operation 320, a replacing section, such as the replacing section 240 of FIG. 2, may replace at least one of IDs (e.g., trip ID) in the plurality of the car probe data with another ID, to generate a pseudonymized ID (e.g., a pseudonymized trip ID) by a known pseudonymization algorithm.

In operation 330, the obtaining section may store at least one absolute position derived from the sequence of absolute positions in a seed data store such as the seed data store 130 of FIG. 1. In an embodiment, the at least one absolute position derived from the sequence of absolute positions is an initial absolute position (e.g., $T_1$, $Lt_1$, $Ln_1$) of the moving object.

In an embodiment, the obtaining section may store the at least one absolute position with at least one of the pseudonymized ID (e.g., the pseudonymized trip ID), thereby associating the at least one absolute position with the pseudonymized ID such as the pseudonymized trip ID.

In operation 340, a generating section, such as the generating section 220 of FIG. 2, may generate the sequence of relative positions of the moving object. In an embodiment, the generating section may generate a sequence of differences of the absolute positions as the sequence of relative positions, where each difference is between two absolute positions at adjacent times.

In the embodiment, the sequence of relative positions may include a sequence of relative latitudes and a sequence of relative longitudes of the moving object. In an embodiment, the generating section may also generate a sequence of temporal differences from the sequence of times as a part of the sequence of relative positions.

In operation 350, a randomizing section, such as the randomizing section 230 of FIG. 2, may randomize the sequence of relative positions using at least a sequence of random numbers generated from at least one seed. In an embodiment, the randomizing section may generate random numbers represented by $rand_n(seed)$, where $rand_n$ is a function to generate a random number from the seed and n is an integer. In the embodiment, the sequence of the random numbers may include $rand_1(seed)$, $rand_2(seed)$, $rand_3(seed)$ . . . $rand_n(seed)$.

In an embodiment, the randomizing section may prepare a first $seed_{Lt}$ for the sequence of relative latitudes (e.g., $\Delta Lt_1$ . . . $\Delta Lt_5$), and a second $seed_{Ln}$ for the sequence of relative longitudes (e.g., $\Delta Ln_1$ . . . $\Delta Ln_5$). In an embodiment, the randomizing section may further prepare a third $seed_T$ for the sequence of temporal differences (e.g., $\Delta T_1$ . . . $\Delta T_5$) in addition to the first $seed_{Lt}$ and the second $seed_{Ln}$.

In the embodiment, the randomizing section may randomize the sequence of relative latitudes (e.g., $\Delta Lt_1$ . . . $\Delta Lt_5$) using a sequence of random numbers (e.g., $rand_1(seed_{Lt})$ . . . $rand_5(seed_{Lt})$) generated from the first $seed_{Lt}$, and may randomize the sequence of relative longitudes (e.g., $\Delta Ln_1$ . . . $\Delta Ln_5$) using a sequence of random numbers (e.g., $rand_1(seed_{Ln})$ . . . $rand_5(seed_{Ln})$) generated from the second $seed_{Ln}$.

In an embodiment, the randomizing section may further randomize the sequence of temporal differences (e.g., $\Delta T_1$ . . . $\Delta T_5$) using a sequence of random numbers (e.g., $rand_1(seed_T)$ . . . $rand_5(seed_T)$) generated from the third $seed_T$. In an embodiment, the randomizing section may include a pseudo random number generator that generates a sequence of pseudo random numbers from the at least one seed.

The randomizing section may utilize at least one of addition, subtraction, multiplication, and division including the sequence of relative positions and the sequence of random numbers, to generate the randomized sequence. In a specific embodiment, the randomizing section may calculate $\Delta Lt_n + rand_n(seed_{Lt})$ to generate the randomized relative latitudes $\Delta Lt_n'$, and calculate $\Delta Ln_n + rand_n(seed_{Lt})$ to generate the randomized relative longitudes $\Delta Ln_n'$. In an embodiment, the randomizing section may further calculate $\Delta T_n + rand_n(seed_T)$ to generate the randomized temporal differences $\Delta T_n'$.

Figure 4:
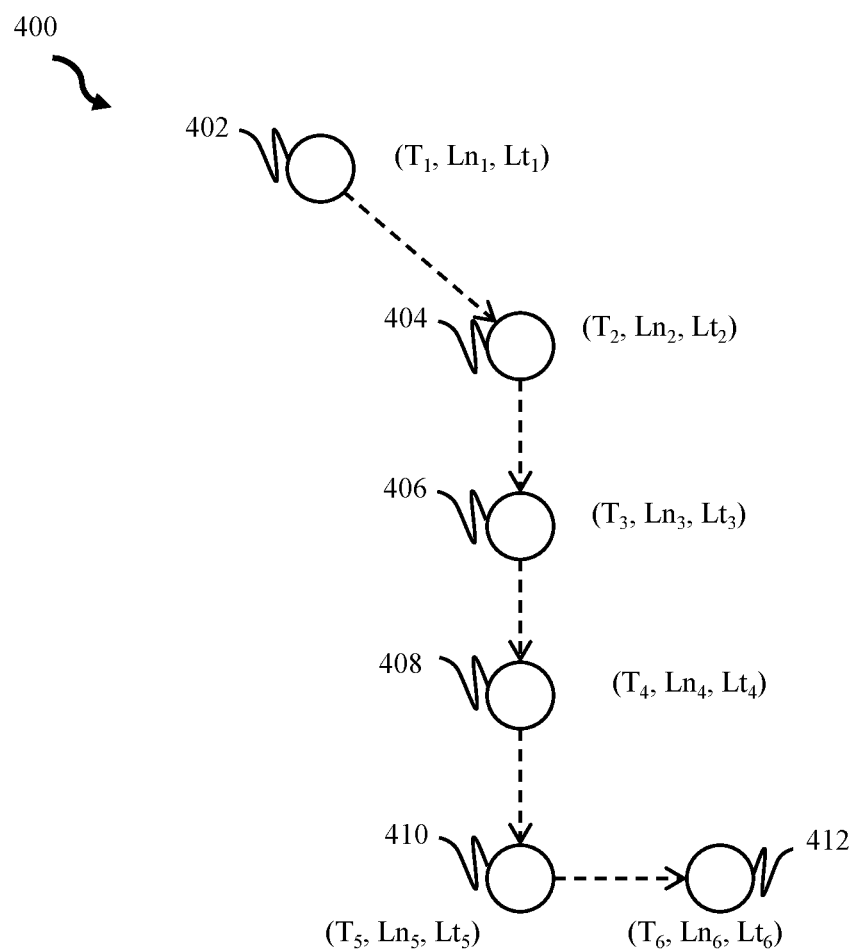
FIG. 4 is a diagrammatic depiction of example absolute positions, in accordance with some embodiments of the present disclosure.
Figure 5:
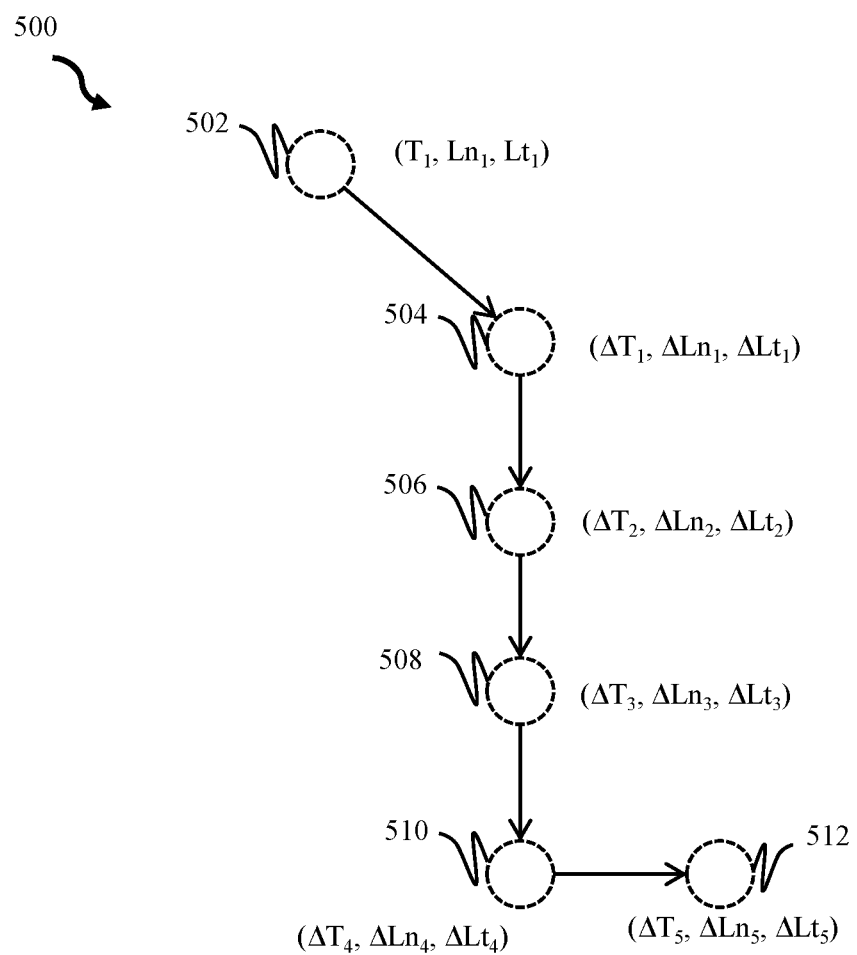
FIG. 5 is a diagrammatic depiction of example relative positions, in accordance with some embodiments of the present disclosure.

In operation 360, the randomizing section may store the randomized sequences and the at least one seed. In the embodiment of FIGS. 4-5, the randomizing section may store $\Delta Lt_1'$ . . . $\Delta Lt_5'$, $\Delta Ln_1'$ . . . $\Delta Ln_5'$, $\Delta T_1'$ . . . $\Delta T_5'$ as the randomized sequences and $seed_{Lt}$, $seed_{Ln}$, $seed_T$ as the seeds.

The randomizing section may store the at least one seed in a seed data store such as the seed data store 130 of FIG. 1. In an embodiment, the randomizing section may store the at least one seed with at least one of the pseudonymized ID (e.g., the pseudonymized trip ID), thereby associating the at least one seed with the pseudonymized ID such as the pseudonymized trip ID.

The randomizing section may store the randomized sequence in a data lake such as the data lake 140 of FIG. 1 via the data hub such as the data hub 110 of FIG. 1. In an embodiment, the randomizing section may provide the randomized sequences to the data hub, and the data hub may store the randomized sequences in the data lake.

In embodiments, apparatus 200 may perform the method 300 for a plurality of sequences of absolute positions, and store a plurality of randomized sequences in the data lake via the data hub. Thereby, the apparatus may store randomized sequences of relative positions of a plurality of cars, according to an embodiment.

It is noted that FIG. 3 is intended to depict the representative operations of an example method 300 for pseudonymization. In some embodiments, however, individual operations can have greater or lesser complexity than as represented in FIG. 3, operations other than or in addition to those shown in FIG. 3 can be present, and the number, type, and configuration of such operations can vary.

FIG. 4 shows a diagrammatic depiction of example absolute positions 400, in embodiments with the present disclosure. In the embodiment of FIG. 4, a moving object such as a car may pass through a sequence of 6 absolute positions: position 402, position 404, position 406, position 408, position 410, and position 412.

The sequence of absolute positions 402-412 may include the latitudes and longitudes of the moving object. The sequence of absolute positions 402-412 may also include a sequence of times, each time at which the moving object is located in a corresponding absolute position.

For example, the sequence of absolute positions 402, 404, 406, 408, 410, and 412 may indicate that the moving object passes through latitude $Lt_1$, longitude $Ln_1$ at time $T_1$, then passes through latitude $Lt_2$, longitude $Ln_2$ at time $T_2$, then passes through latitude $Lt_3$, longitude $Ln_3$ at time $T_3$, then passes through latitude $Lt_4$, longitude $Ln_4$ at time $T_4$, then passes through latitude $Lt_5$, longitude $Ln_5$ at time $T_5$, then passes through latitude $Lt_6$, longitude $Ln_6$ at time $T_6$.

In the embodiment, the sequence of absolute positions 402-412 may include $(T_1, Lt_1, Ln_1)$, $(T_2, Lt_2, Ln_2)$, $(T_3, Lt_3, Ln_3)$, $(T_4, Lt_4, Ln_4)$, $(T_5, Lt_5, Ln_5)$, and $(T_6, Lt_6, Ln_6)$. In the embodiment, the first absolute position $(T_1, Lt_1, Ln_1)$ may be referred to as an initial absolute position.

FIG. 5 a diagrammatic depiction of example relative positions 500, in embodiments with the present disclosure. In embodiments, absolute positions 402-412 of FIG. 4 can be represented as absolute positions 502-512, respectively in FIG. 5. In the embodiment of FIG. 5, the generating section may generate a sequence of 5 relative positions $(\Delta T_1, \Delta Lt_1, \Delta Ln_1)$, $(\Delta T_2, \Delta Lt_2, \Delta Ln_2)$, $(\Delta T_3, \Delta Lt_3, \Delta Ln_3)$, $(\Delta T_4, \Delta Lt_4, \Delta Ln_4)$, $(\Delta T_5, \Delta Lt_5, \Delta Ln_5)$ by calculating $(T_2-T_1, Lt_2-Lt_1, Ln_2-Ln_1)$, $(T_3-T_2, Lt_3-Lt_2, Ln_3-Ln_2)$, $(T_4-T_3, Lt_4-Lt_3, Ln_4-Ln_3)$, $(T_5-T_4, Lt_5-Lt_4, Ln_5-Ln_4)$, and $(T_6-T_5, Lt_6-Lt_5, Ln_6-Ln_5)$.

Figure 6:
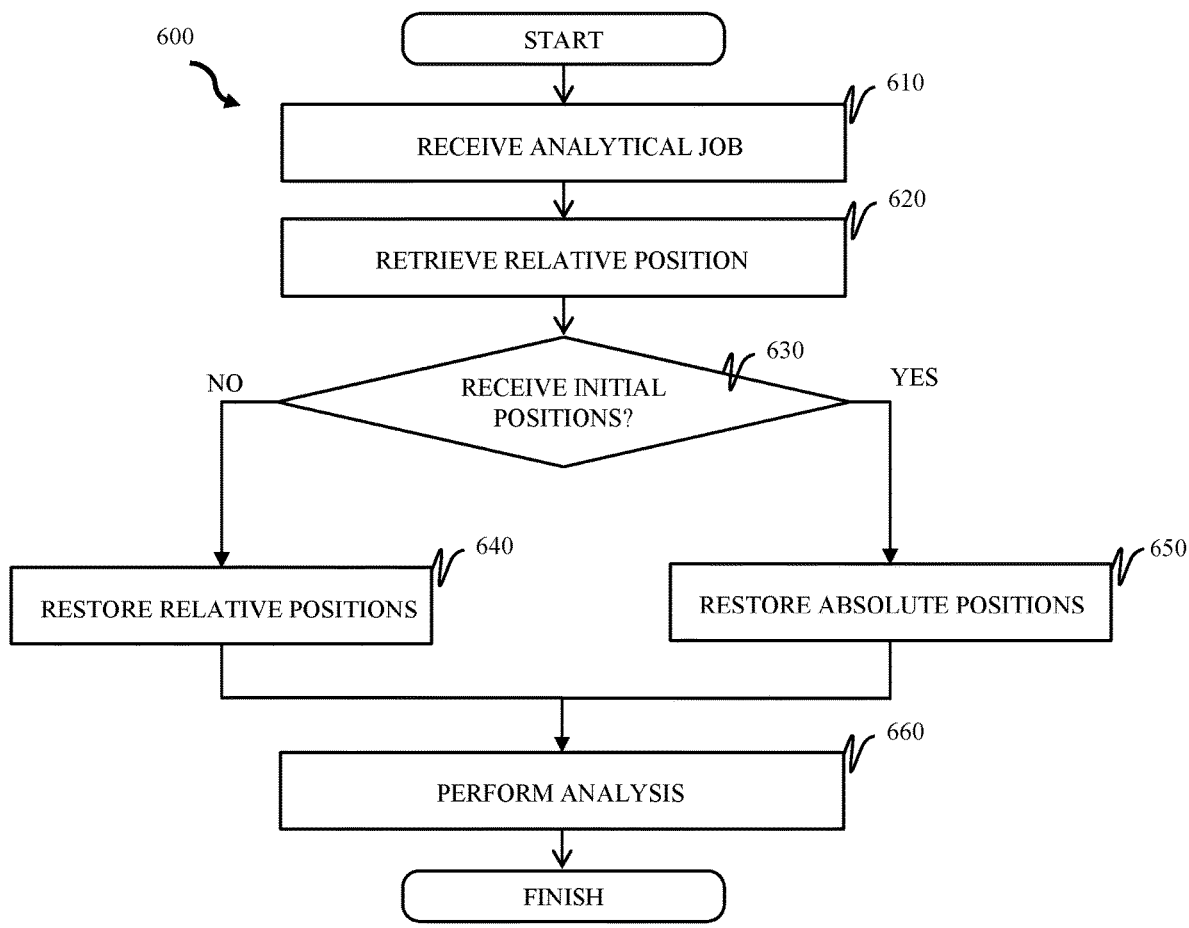
FIG. 6 is a flow diagram illustrating an example method for pseudonymization restoration, in accordance with some embodiments of the present disclosure.

FIG. 6 is a flow diagram illustrating an example method 600 for pseudonymization restoration, in embodiments with the present disclosure. The example method 600 can be implemented by a system, such as the system 100 of FIG. 1, which performs analysis operations of the method 600. In embodiments, the method 600 operates to restore absolute position 400 of FIG. 4 or relative position 500 of FIG. 5 for a moving object. The method 600 begins in operation 610.

In operation 610, an analytics engine, such as the analytics engine 150 of FIG. 1, may receive an analytical job from a client computer such as the client computer 170 of FIG. 1. The analytical job may include (i) at least one seed, or, (ii) at least one seed and at least one absolute position of a moving object.

In an embodiment, the analytical job may include (i) $seed_{Lt}$, $seed_{Ln}$, $seed_T$, or (ii) $seed_{Lt}$, $seed_{Ln}$, $seed_T$ and $Lt_1$, $Ln_1$, $T_1$. The analytical job may further include at least one of a pseudonymized IDs such as a pseudonymized trip ID corresponding to the at least one seed.

In an embodiment, the client computer may preliminarily obtain (i) at least one seed, or (ii) at least one seed and at least one absolute position from a seed data store, such as the seed data store 130 of FIG. 1. The client computer may also obtain at least one of a pseudonymized ID such as a pseudonymized trip ID corresponding to the at least one seed from the seed data store. Then the client computer may send the analytical job to the analytics engine.

In operation 620, the analytics engine may retrieve a randomized sequence of relative positions of the moving object. In an embodiment, the analytics engine may search for the randomized sequence corresponding to the pseudonymized ID such as pseudonymized trip ID included in the analytical job. In an embodiment, the analytics engine may obtain $\Delta Lt_1' \ldots \Delta Lt_5', \Delta Ln_1' \ldots \Delta Ln_5', \Delta T_1' \ldots \Delta T_5'$ as the randomized sequence.

The analytics engine may provide the pseudonymization engine with the retrieved randomized sequence, and (i) at least one seed, or (ii) at least one seed and at least one absolute position of a moving object included in the analytical job. A restoring section, such as the restoring section 250 of the apparatus 200 operating as the pseudonymization engine, may receive the retrieved randomized sequence, and (i) at least one seed, or, (ii) at least one seed and at least one absolute position of a moving object.

In decision 630, the restoring section may determine whether the restoring section has received the initial positions from the analytics engine. In an embodiment, the restoring section may determine whether the restoring section has received (ii) at least one seed and at least one absolute position of a moving object at operation 620. If the decision is positive, then the restoring section may proceed with operation 650. If the decision is negative, then the restoring section may proceed with operation 640.

In operation 640, the restoring section may restore the sequence of relative positions of the moving object from the randomized sequence of relative positions and the at least one seed. The restoring section may first generate a sequence of random numbers from the at least one seed. In an embodiment, the restoring section may generate $rand_1$(seed), $rand_2$(seed), $rand_3$(seed) . . . from the seed. In a particular embodiment, the restoring section may generate $rand_1(seed_{Lt}) \ldots rand_5(seed_{Lt})$, $rand_1(seed_{Ln}) \ldots rand_5(seed_{Ln})$, and $rand_1(seed_T) \ldots rand_5(seed_T)$ from $seed_{Lt}$, $seed_{Ln}$, and $seed_T$.

Then, the restoring section may calculate the sequence of relative position by using the randomized sequence of relative positions and the sequence of random numbers. The restoring section may calculate the sequence of relative positions by performing a reverse operation of randomization of the randomizing section at operation 350 of FIG. 1.

In an embodiment, the restoring section may calculate $\Delta Lt_n'-rand_n(seed_{Lt})$ to restore the relative latitudes $\Delta Lt_n$, and calculate $\Delta Ln_n'-rand_n(seed_{Ln})$ to restore the relative longitudes $\Delta Ln_n$. In an embodiment, the randomizing section may further calculate $\Delta T_n'-rand_n(seed_T)$ to restore the temporal differences $\Delta T_n$.

The restoring section may provide the analytics engine with the restored sequence of relative positions of the moving object. The restored sequence of relative positions may include the restored sequence of temporal differences. In an embodiment, the restoring section may provide $\Delta Lt_1 \ldots \Delta Lt_5, \Delta Ln_1 \ldots \Delta Ln_5$, and $\Delta T_1 \ldots \Delta T_5$. In an embodiment, the restoring section may provide only some of the restored sequence of relative positions (e.g., only $(\Delta T_1, \Delta Lt_1, \Delta Ln_1)$, $(\Delta T_3, \Delta Lt_3, \Delta Ln_3)$ and, $(\Delta T_5, \Delta Lt_5, \Delta Ln_5)$ among $(\Delta T_1, \Delta Lt_1, \Delta Ln_1) \ldots (\Delta T_5, \Delta Lt_5, \Delta Ln_5)$) to the analytics engine to keep a higher pseudonymization level.

In operation 650, the restoring section may restore the sequence of absolute positions of the moving object from the randomized sequence of relative positions, the at least one seed, and the at least one absolute position.

The restoring section may first restore the sequence of relative positions of the moving object in the same manner explained in relation to operation 640. The restoring section may then restore the sequence of absolute positions from the sequence of relative positions and the at least one absolute position.

In an embodiment, the restoring section may calculate $Lt_n+\Delta Lt_n$ to generate $Lt_{n+1}$. In a specific embodiment, the restoring section may calculate $Lt_1+\Delta Lt_1$ to generate $Lt_2$, calculate $Lt_2+\Delta Lt_2$ to generate $Lt_3$, calculate $Lt_3+\Delta Lt_3$ to generate $Lt_4$, calculate $Lt_4+\Delta Lt_4$ to generate $Lt_5$, calculate $Lt_5+\Delta Lt_5$ to generate $Lt_6$, from $Lt_1$ and $\Delta Lt_1 \ldots \Delta Lt_5$.

In an embodiment, the restoring section may calculate $Ln_1+\Delta Ln_1$ to generate $Ln_2$, calculate $Ln_2+\Delta Ln_2$ to generate $Ln_3$, calculate $Ln_3+\Delta Ln_3$ to generate $Ln_4$, calculate $Ln_4+\Delta Ln_4$ to generate $Ln_5$, calculate $Ln_5+\Delta Ln_5$ to generate $Ln_6$, from $Ln_1$ and $\Delta Ln_1 \ldots \Delta Ln_5$. The restoring section may further calculate $T_1+\Delta T_1$ to generate $T_2$, calculate $T_2+\Delta T_2$ to generate $T_3$, calculate $T_3+\Delta T_3$ to generate $T_4$, calculate $T_4+\Delta T_4$ to generate $T_5$, calculate $T_5+\Delta T_5$ to generate $T_6$, from $T_1$ and $\Delta T_1 \ldots \Delta T_5$.

The restoring section may provide the analytics engine with the restored sequence of absolute positions of the moving object. The restored sequence of absolute positions may include the restored sequence of times. In an embodiment, the restoring section may provide $(T_1, Lt_1, Ln_1) \ldots (T_5, Lt_5, Ln_5)$. In an embodiment, the restoring section may provide only some of the restored sequence of absolute positions (e.g., only $(T_1, Lt_1, Ln_1)$, $(T_3, Lt_3, Ln_3)$ and, $(T_5, Lt_5, Ln_5)$ among $(T_1, Lt_1, Ln_1) \ldots (T_5, Lt_5, Ln_5)$) to the analytics engine to keep a higher pseudonymization level.

At operation 660, the analytics engine may perform analysis by using at least the sequence of relative positions (e.g., $\Delta Lt_1 \ldots \Delta Lt_5, \Delta Ln_1 \ldots \Delta Ln_5$, and $\Delta T_1 \ldots \Delta T_5$) or the sequence of absolute positions (e.g., $Lt_1 \ldots Lt_5$, $Ln_1 \ldots Ln_5$, and $T_1 \ldots T_5$).

In the embodiments above, the apparatus may restore one sequence of relative or absolute positions of one moving object. However, the apparatus may restore a plurality of sequences of relative or absolute positions of one or more moving objects. For example, the analytical job may include a plurality sets of (i) at least one seed, or, (ii) at least one seed and at least one absolute position for the plurality of sequences.

In an embodiment, the analytics engine may obtain the plurality of sequences of absolute or relative positions from a plurality of trips and/or cars, and perform the analysis on the plurality of sequences. In an embodiment, the analytics engine may extract a common pattern or feature from the plurality of sequences. In an embodiment, the analytics engine may construct a prediction model of car movements from the plurality of sequences.

According to the embodiments above, the pseudonymization engine may provide position information in different pseudonymized levels, by restoring the sequence of relative positions or the sequence of the absolute positions. For example, if it is not appropriate to provide absolute positions of a moving object to client computer 170 of FIG. 1, the seed data store may only provide client computer 170 of FIG. 1 with only the seed, and the pseudonymization engine may restore only the sequence of the relative positions.

In addition, according to the embodiments above, the sequence of relative positions (e.g., $\Delta T_n$, $\Delta Lt_n$, $\Delta Ln_n$) and the at least one absolute position $(T_1, Lt_1, Ln_1)$ are stored in separate locations (e.g., seed data storage 130 of FIG. 1, data lake 140 of FIG. 1). Furthermore, the at least one of the pseudonymized ID such as the pseudonymized trip ID is stored separately from the sequence of relative positions (e.g., $\Delta T_n$, $\Delta Lt_n$, $\Delta Ln_n$). Thereby, security for the absolute positions is improved. Even if the relative positions are intercepted, it is not possible to restore all absolute positions, ID in car probe data (e.g., trip ID) by themselves.

In another embodiment, the restoring section may restore a group of relative positions of the moving object. The relative positions in the group are randomly ordered, and a trajectory of the moving object may not be restored from the group.

It is noted that FIG. 6 is intended to depict the representative operations of an example method 600 for pseudonymization restoration. In some embodiments, however, individual operations can have greater or lesser complexity than as represented in FIG. 6, operations other than or in addition to those shown in FIG. 6 can be present, and the number, type, and configuration of such operations can vary.

Figure 7:
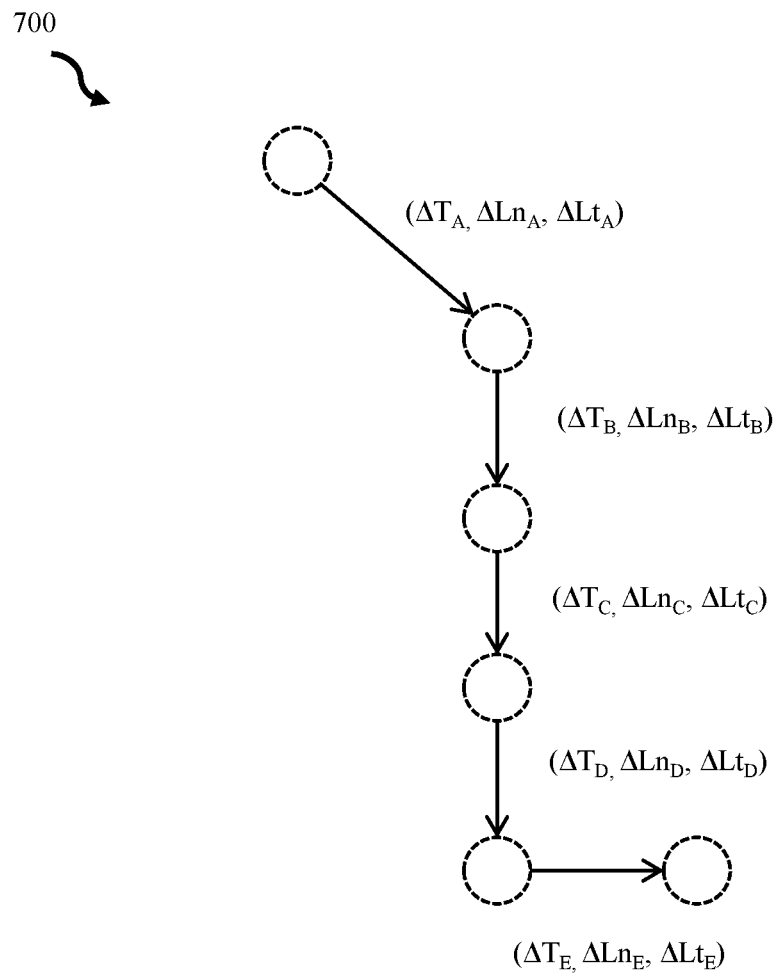
FIG. 7 is a diagrammatic depiction illustrating an example group of relative positions, in accordance with some embodiments of the present disclosure.

FIG. 7 illustrates an example group of relative positions 700, in embodiments with the present disclosure. The group of relative positions 700 can include 5 relative positions $(\Delta T_A, \Delta Lt_A, \Delta Ln_A)$, $(\Delta T_B, \Delta Lt_B, \Delta Ln_B)$, $(\Delta T_C, \Delta Lt_C, \Delta Ln_C)$, $(\Delta T_D, \Delta Lt_D, \Delta Ln_D)$, $(\Delta T_E, \Delta Lt_E, \Delta Ln_E)$.

The group does not include information of the original order of the relative positions. Therefore, the group represents a group of vectors with time. The analytics engine may perform analytics on this group of vectors.

Figure 8:
FIG. 8 is a diagrammatic depiction illustrating an example interface message with absolute positions, in accordance with some embodiments of the present disclosure.

FIG. 8 is a diagrammatic depiction illustrating an example interface message 800 with absolute positions, in embodiments with the present disclosure. In an embodiment, a client computer may send the analytical job having the interface message 800 to the analytics engine.

The analytical job is to request analyzing driver behavior, and includes as the initial absolute position "orig_time": "20xx12021301" (which may correspond to $T_1$), "orig_lon": "28.0284711" (which may correspond to $Ln_1$), "orig_lat": "123.032123" (which may correspond to $Lt_1$). The analytical job includes as one seed "seed": 1098.2342.

The analytical job further includes a range such as ""from": "2017-04-02", "to": "2017-04-10"" for retrieving the randomized sequences. For example, the analytics engine may retrieve the randomized sequence of relative positions recorded during 2017-04-02 to 2017-04-10 with the analytical job of interface message 800.

Figure 9:
FIG. 9 is a diagrammatic depiction illustrating an example interface message without absolute positions, in accordance with some embodiments of the present disclosure.

FIG. 9 is a diagrammatic depiction illustrating an example interface message 900 without absolute positions, in embodiments with the present disclosure. In an embodiment, a client computer may send the analytical job having the interface message 900 to the analytics engine. The interface message 900 differs from the interface message 800 only in that it does not include the initial absolute position such as "orig_time": "20xx12021301", "orig_lon": "28.0284711", "orig_lat": "123.032123".

In the embodiments above, the at least one absolute position may be an initial absolute position such as $(T_1, Lt_1, Ln_1)$. In another embodiment, the at least one absolute positions may be a center of the absolute positions of the moving object. In the embodiment, the obtaining section may calculate the center of the absolute positions and store the center as the at least one absolute position. For example, in the embodiment of FIGS. 4-5, the obtaining section may calculate $(T_1+T_2+T_3+T_4+T_5)/5$, $(Lt_1+Lt_2+Lt_3+Lt_4+Lt_5)/5$, $(Ln_1+Ln_2+Ln_3+Ln_4+Ln_5)/5$ to obtain an absolute position $(T_c, Lt_c, Ln_c)$, and store $(T_c, Lt_c, Ln_c)$ in the seed data store at operation 330 of FIG. 3.

In the embodiment, the generating section may generate the sequence of relative positions that is a sequence of differences, where each difference is between the center of the absolute positions and a corresponding absolute position. For example, the generating section may generate a sequence of 6 relative positions $(\Delta T_1, \Delta Lt_1, \Delta Ln_1)$, $(\Delta T_2, \Delta Lt_2, \Delta Ln_2)$, $(\Delta T_3, \Delta Lt_3, \Delta Ln_3)$, $(\Delta T_4, \Delta Lt_4, \Delta Ln_4)$, $(\Delta T_5, \Delta Lt_5, \Delta Ln_5)$, $(\Delta T_6, \Delta Lt_6, \Delta Ln_6)$ by calculating $(T_c-T_1, Lt_c-Lt_1, Ln_c-Ln_1)$, $(T_c-T_2, Lt_c-Lt_2, Ln_c-Ln_2)$, $(T_c-T_3, Lt_c-Lt_3, Ln_c-Ln_3)$, $(T_c-T_4, Lt_c-Lt_4, Ln_c-Ln_4)$, $(T_c-T_5, Lt_c-Lt_5, Ln_c-Ln_5)$, and $(T_c-T_6, Lt_c-Lt_6, Ln_c-Ln_6)$.

In an alternative embodiment, the absolute positions may include altitude of a moving object and the relative positions may include a sequence of a relative altitude of the moving object.

Figure 10:
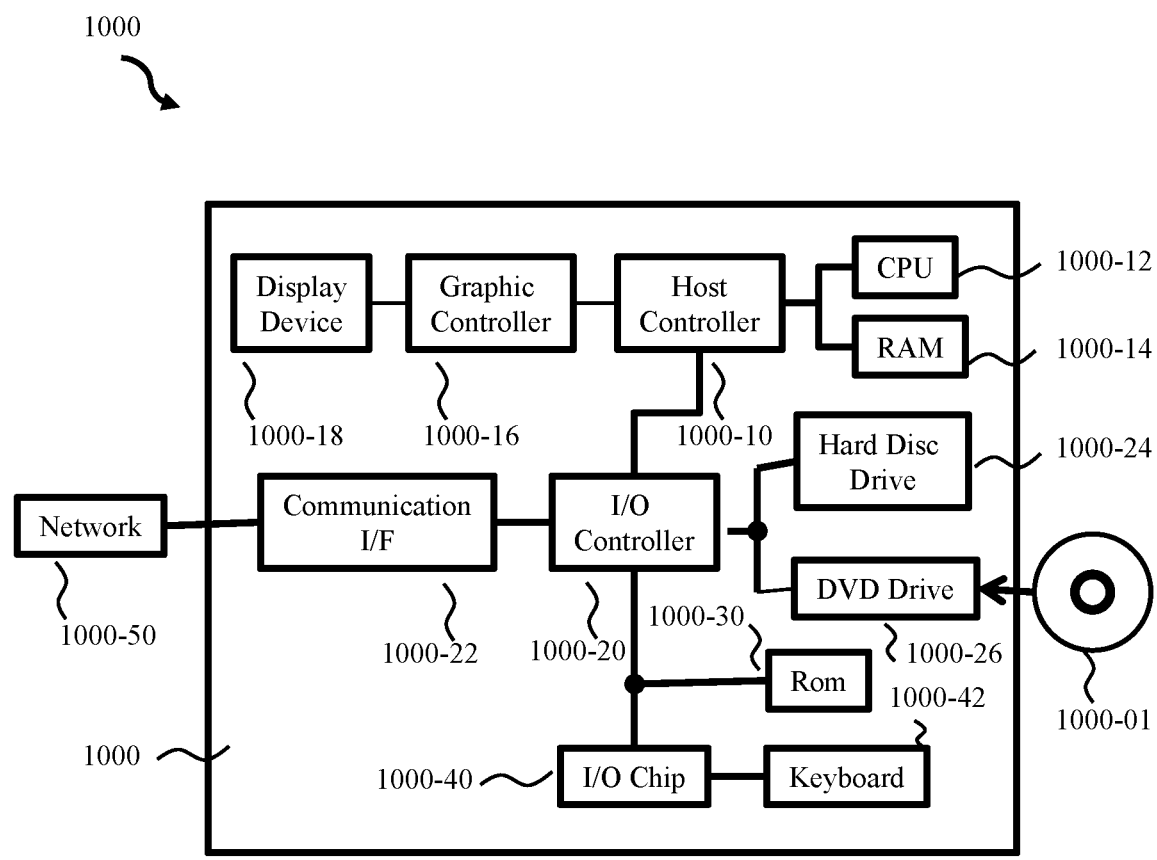
FIG. 10 is a diagrammatic depiction illustrating an example hardware configuration, in accordance with some embodiments of the present disclosure.

FIG. 10 is a diagrammatic depiction illustrating an example hardware configuration 1000, in embodiments with the present disclosure. In embodiments, hardware configuration 1000 can be a hardware configuration of a computer configured for pseudonymizing position data.

A program that is installed in the computer 1000 can cause the computer 1000 to function as or perform operations associated with apparatuses of the embodiments of the present invention or one or more sections (including modules, components, elements, etc.) thereof, and/or cause the computer 1000 to perform processes of the embodiments of the present invention or steps thereof. Such a program may be executed by the CPU 1000-12 to cause the computer 1000 to perform certain operations associated with some or all of the blocks of flowcharts and block diagrams described herein.

The computer 1000 according to the present embodiment includes a CPU 1000-12, a RAM 1000-14, a graphics controller 1000-16, and a display device 1000-18, which are mutually connected by a host controller 1000-10.

The computer 1000 also includes input/output units such as a communication interface 1000-22, a hard disk drive 1000-24, a DVD-ROM drive 1000-26 and an IC card drive, which are connected to the host controller 1000-10 via an input/output controller 1000-20. The computer also includes legacy input/output units such as a ROM 1000-30 and a keyboard 1000-42, which are connected to the input/output controller 1000-20 through an input/output chip 1000-40.

The CPU 1000-12 operates according to programs stored in the ROM 1000-30 and the RAM 1000-14, thereby controlling each unit. The graphics controller 1000-16 obtains image data generated by the CPU 1000-12 on a frame buffer or the like provided in the RAM 1000-14 or in itself, and causes the image data to be displayed on the display device 1000-18.

The communication interface 1000-22 communicates with other electronic devices via a network 1000-50. The hard disk drive 1000-24 stores programs and data used by the CPU 1000-12 within the computer 1000. The DVD-ROM drive 1000-26 reads the programs or the data from the DVD-ROM 1000-01, and provides the hard disk drive 100-24 with the programs or the data via the RAM 1000-14. The IC card drive reads programs and data from an IC card, and/or writes programs and data into the IC card.

The ROM 1000-30 stores therein a boot program or the like executed by the computer 1000 at the time of activation, and/or a program depending on the hardware of the computer 1000. The input/output chip 1000-40 may also connect various input/output units via a parallel port, a serial port, a keyboard port, a mouse port, and the like to the input/output controller 1000-20.

A program is provided by computer readable media such as the DVD-ROM 1000-01 or the IC card. The program is read from the computer readable media, installed into the hard disk drive 1000-24, RAM 1-00-14, or ROM 1000-30, which are also examples of computer readable media, and executed by the CPU 1000-12. The information processing described in these programs is read into the computer 1000, resulting in cooperation between a program and the above-mentioned various types of hardware resources. An apparatus or method may be constituted by realizing the operation or processing of information in accordance with the usage of the computer 1000.

For example, when communication is performed between the computer 1000 and an external device, the CPU 1000-12 may execute a communication program loaded onto the RAM 1000-14 to instruct communication processing to the communication interface 1000-22, based on the processing described in the communication program. The communication interface 1000-22, under control of the CPU 1000-12, reads transmission data stored on a transmission buffering region provided in a recording medium such as the RAM 1000-14, the hard disk drive 1000-24, the DVD-ROM 1000-01, or the IC card, and transmits the read transmission data to network 1000-50 or writes reception data received from network 1000-50 to a reception buffering region or the like provided on the recording medium.

In addition, the CPU 1000-12 may cause all or a necessary portion of a file or a database to be read into the RAM 1000-14, the file or the database having been stored in an external recording medium such as the hard disk drive 1000-24, the DVD-ROM drive 1000-26 (DVD-ROM 1000-01), the IC card, etc., and perform various types of processing on the data on the RAM 1000-14. The CPU 1000-12 may then write back the processed data to the external recording medium.

Various types of information, such as various types of programs, data, tables, and databases, may be stored in the recording medium to undergo information processing. The CPU 1000-12 may perform various types of processing on the data read from the RAM 1000-14, which includes various types of operations, processing of information, condition judging, conditional branch, unconditional branch, search/replace of information, etc., as described throughout this disclosure and designated by an instruction sequence of programs, and writes the result back to the RAM 1000-14.

In addition, the CPU 1000-12 may search for information in a file, a database, etc., in the recording medium. For example, when a plurality of entries, each having an attribute value of a first attribute is associated with an attribute value of a second attribute, are stored in the recording medium, the CPU 1000-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 1000. In addition, a recording medium such as a hard disk or a RAM provided in a server system connected to a dedicated communication network or the Internet can be used as the computer readable media, thereby providing the program to the computer 1000 via the network.

The present invention may be a system, a method, and/or a computer program product. The computer program product may include a computer readable storage medium (or media) having computer readable program instructions thereon for causing a processor to carry out aspects of the present invention. The apparatus of the embodiments of the present invention may include the computer readable medium and the processor or programmable circuitry operable to execute the instructions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention enable to gradually pseudonymize position data.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus for position data pseudonymization, the apparatus comprising:
   a processor with programmable circuitry, and
   one or more computer readable mediums collectively including instructions that, when executed by the processor or the programmable circuitry, cause the processor or the programmable circuitry to:
   generate a sequence of relative positions from a sequence of absolute positions of a moving object;
   randomize the sequence of relative positions using at least a sequence of random numbers generated from at least one seed;
   in response to receiving an analytical job comprising the at least one seed, restore the sequence of relative positions from the randomized sequence of relative positions; and
   in response to receiving an analytical job comprising both the at least one seed and the at least one absolute position derived from the sequence of absolute positions, restore the sequence of absolute positions from the randomized sequence of relative positions.

2. The apparatus of claim 1, wherein the absolute positions include latitudes and longitudes of the moving object; and
   the sequence of relative positions includes a sequence of relative latitudes and a sequence of relative longitudes of the moving object.

3. The apparatus of claim 2, wherein the randomizing the sequence of relative positions using at least a sequence of random numbers generated from at least one seed includes:
   randomizing the sequence of relative latitudes using a sequence of random numbers generated from a first seed; and
   randomizing the sequence of relative longitudes using a sequence of random numbers generated from a second seed.

4. The apparatus of claim 2, wherein the sequence of absolute positions includes a sequence of times, each time at which the moving object is located in a corresponding absolute position; and the generating of a sequence of relative positions from a sequence of absolute positions includes generating a sequence of temporal differences from the sequence of times.

5. The apparatus of claim 4, wherein the randomizing the sequence of relative positions using at least a sequence of random numbers generated from at least one seed includes:

randomizing the sequence of relative latitudes using a sequence of random numbers generated from a first seed among the at least one seed;

randomizing the sequence of relative longitudes using a sequence of random numbers generated from a second seed among the at least one seed; and randomizing the sequence of temporal differences using at a sequence of random numbers generated from a third seed among the at least one seed.

6. A computer program product for position data pseudonymization, the computer program product including one or more computer readable storage mediums collectively storing program instructions that are executable by a processor or programmable circuitry to cause the processor or programmable circuitry to perform operations comprising:

generating a sequence of relative positions from a sequence of absolute positions of a moving object;

randomizing the sequence of relative positions using at least a sequence of random numbers generated from at least one seed;

in response to receiving an analytical job comprising the at least one seed, restoring the sequence of relative positions from the randomized sequence of relative positions; and in response to receiving an analytical job comprising both the at least one seed and the at least one absolute position derived from the sequence of absolute positions, restoring the sequence of absolute positions from the randomized sequence of relative positions.

7. The computer program product of claim 6, wherein the absolute positions include latitudes and longitudes of the moving object; and the sequence of relative positions includes a sequence of relative latitudes and a sequence of relative longitudes of the moving object.

8. The computer program product of claim 7, wherein the randomizing the sequence of relative positions using at least a sequence of random numbers generated from at least one seed includes:

randomizing the sequence of relative latitudes using a sequence of random numbers generated from a first seed; and randomizing the sequence of relative longitudes using a sequence of random numbers generated from a second seed.

9. The computer program product of claim 7, wherein the sequence of absolute positions includes a sequence of times, each time at which the moving object is located in a corresponding absolute position; and the generating of a sequence of relative positions from a sequence of absolute positions includes generating a sequence of temporal differences from the sequence of times.

\* \* \* \* \*